United States Patent [19]

Korb et al.

[11] Patent Number: 4,813,144

[45] Date of Patent: Mar. 21, 1989

[54] ARMORED CABLE CUTTING DEVICE

[75] Inventors: William B. Korb, Melrose, Conn.; Paul W. Koetsch, Springfield, Mass.

[73] Assignee: American Saw & MFG. Company, East Longmeadow, Mass.

[21] Appl. No.: 141,825

[22] Filed: Jan. 11, 1988

[51] Int. Cl.$^4$ ............................................. B21F 13/00
[52] U.S. Cl. ...................................... 30/90.3; 30/91.1; 30/91.2
[58] Field of Search ...................... 30/90.3, 90.4, 90.8, 30/91.1, 91.2; 83/452, 456, 465, 54

[56] References Cited

U.S. PATENT DOCUMENTS

| | | | |
|---|---|---|---|
| 2,064,661 | 12/1936 | Hammond | 30/94 |
| 2,176,646 | 10/1939 | Thatcher | 30/90.3 |
| 2,654,941 | 10/1953 | Schleimer | 30/90.3 |
| 2,674,027 | 4/1954 | Kosinski | 30/90.3 |
| 3,851,387 | 12/1974 | Ducret | 30/90.3 |
| 4,267,636 | 5/1981 | Ducret | 30/90.3 |
| 4,359,819 | 11/1982 | Ducret | 30/90.3 |

Primary Examiner—Frank T. Yost
Assistant Examiner—Eugenia A. Jones
Attorney, Agent, or Firm—Chapin, Neal & Dempsey

[57] ABSTRACT

A cutting device for cutting the shield of an armored cable has three mutually hinged members. One member is interposed between the other two and has a channel opening on one side for receiving the shielded cable therein. The second member is pivotable at one end of the first member and has a rotatable, circular cutter. The upper wall of the channel includes an axial slot to provide an access opening for the circular cutter. The upper wall of the channel member is generally in wedge shape construction for engagement with the upper surface of the shielded cable. The third member is pivotable to the one member at the same end as the second member and includes at its outer end a cable holding plate which extends upwardly from the outer end of the third member. A slot disposed in the lower wall portion of the channel member provides access for movement of the cable holding plate therethrough. The cable holding plate is disposed at an oblique angle relative to the longitudinal axis of the channel and has a wedge-shaped, upper edge configuration which is disposed in opposing relation to the wedge configuration of the upper wall of the channel. The oblique angle corresponds approximately to the helix angle of the convolutions of the armored cable.

4 Claims, 2 Drawing Sheets

ARMORED CABLE CUTTING DEVICE

BACKGROUND OF THE INVENTION

This invention relates to devices for cutting the shielded portion of an armored cable and takes the form of a hand-held tool.

The Schleimer U.S. Pat. No. 2,654,941 discloses a flexible conduit cutting tool which includes a pivotable arm and a cylindrical channel member adapted to receive the armored cable to stabilize the longitudinal position of the cable when the cutting operation is being performed. This patent discloses the use of one or more inwardly turned tabs 29 to engage the conduit between convolutions.

Kosinski U.S. Pat. No. 2,674,027 also discloses a device for cutting armored cable. This device has a channel provided to receive the cable and a wing screw serves to center the cable below the cutter and to hold the cable against longitudinal movement.

Ducret U.S. Pat. No. 3,851,387 discloses an armored cable cutting device in which a pair of hinged arms are provided. One arm carries a radial saw and the other is a channel which holds the cable. An important feature of the Ducret patent is the location of the holding screw 29 whereby the cable is urged upwardly and inwardly within the channel.

Ducret U.S. Pat. No. 4,359,819 discloses another armored cable cutting device comprising three pivotable elongated members. One carries a radial saw, the second provides the channel for receiving the cable which is of the same general configuration as the channel disclosed in the earlier Ducret U.S. Pat. No. 3,851,387. This patent further discloses a third arm, pivotable at the free end of the arm in which a cable receiving channel is provided. A plunger is carried by the pivotable third arm on a leaf spring 45. Except for the substitution of this spring supported plunger, the device operates basically on the same principal as the earlier Ducret patent in that the plunger engages the cable and holds it in fixed position for cutting.

The principal object of this invention is to provide a new and improved device for cutting armored cable which is more effective in operation and simpler in construction than any such cable cutter heretofore available.

Another object of this invention is to provide an improved device for cutting armored cable which is simple to use and in which the cable is more securely held in both the longitudinal and lateral directions while the cutting operation is being performed.

A further object of this invention is to provide an improved cutting device for armored cable which is adaptable without modification to cut different diameter cables.

The above and other objects and advantages of this invention will be more readily apparent from the following description read in conjunction with the accompanying drawings in which.

Figure 1:
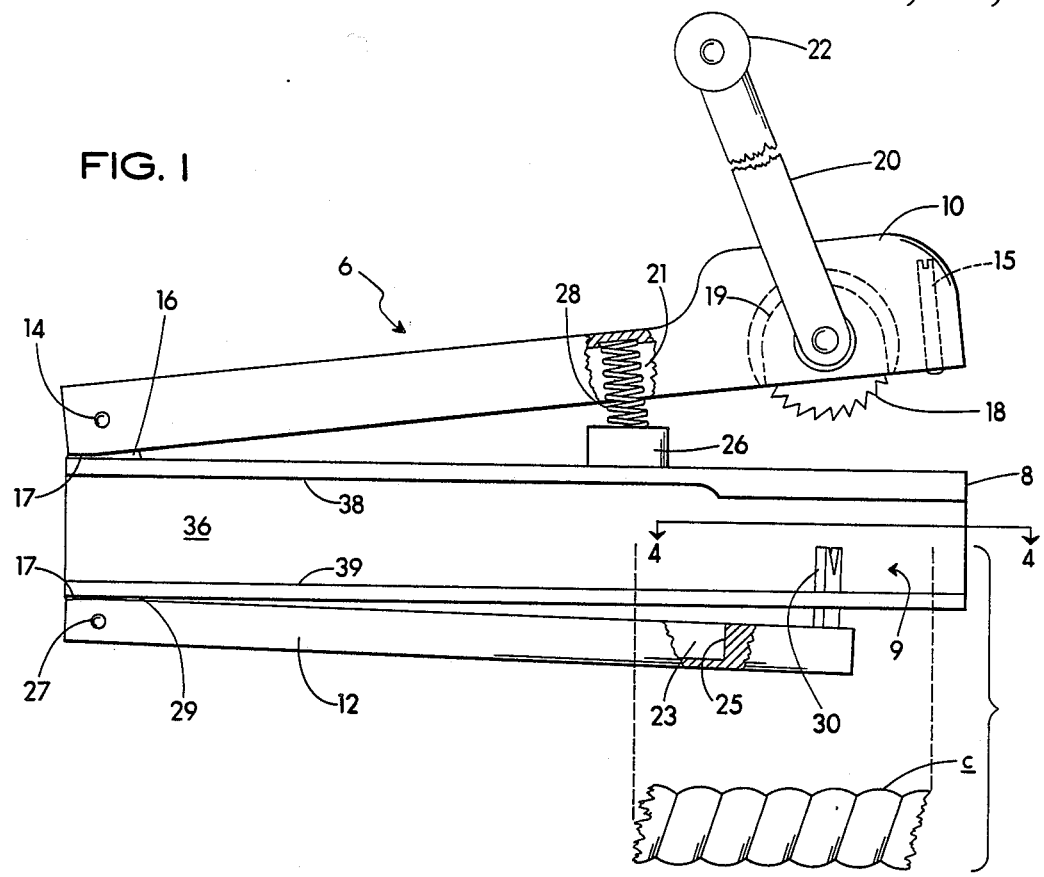
FIG. 1 is a side elevational view showing a cable cutting device embodying this invention.
Figure 2:
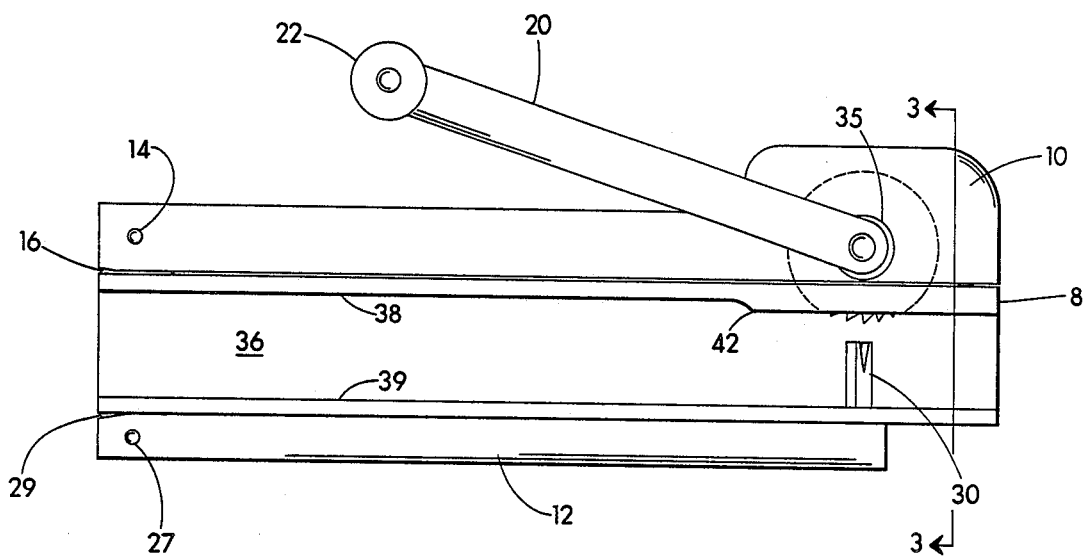
FIG. 2 is a side elevational view similar to FIG. 1 in which the device is disposed in operative condition.

Referring in detail to the drawing, as shown generally at 6 in FIGS. 1 and 2, is a cable cutting tool of the type embodying this invention. The tool comprises three mutually pivotable arm members 8, 10 and 12. The central member 8 comprises a cable receiving channel 9 adapted to receive therein, an armored cable depicted at c in FIG. 1. The two outer members 10 and 12 are hingedly mounted on the same end of member 8 but opposite sides thereof.

Member 8 has a raised knuckle portion 16 disposed adjacent one end thereof which has a configuration to fit with the downwardly opening channel-shaped arm 10, as illustrated at 21. A pin 14 serves to hingedly connect the arms 8 and 10 together for swinging movement toward and away from each other, as illustrated in FIGS. 1 and 2. The edge portions 17 of the arms 10 and 12 outwardly of the pivot pins are disposed at an oblique angle of about 15° and serve to limit the outward swinging movement of the arms relative the central member 8.

A rotatable circular saw blade 18 is disposed adjacent the outer arm of end 10 and is drivingly connected by crank 20 and handle 22 fitted onto a drive shaft rotatable in hub 35 by any suitable fastener means. As illustrated at 21, the arm 10 is of downwardly opening channel configuration. An arcuate slot 19 is provided through one side wall of arm 10 to facilitate installation and replacement of circular saw blades as necessary. A projection 26 extends from the upper surface of arm 8 intermediate its terminal ends and coil spring 28 is fitted at one end into a recess provided within the projection 26. The upper end of the spring is disposed within a small recess disposed in the upper wall of the channel-shaped arm 10. The coil spring releasably urges the arm 10 outwardly of the central member 8. An adjustable stop-screw 15 is fitted into a threaded bore adjacent the outer end of arm 10 to limit the depth of cut of saw blade 18.

Figure 3:
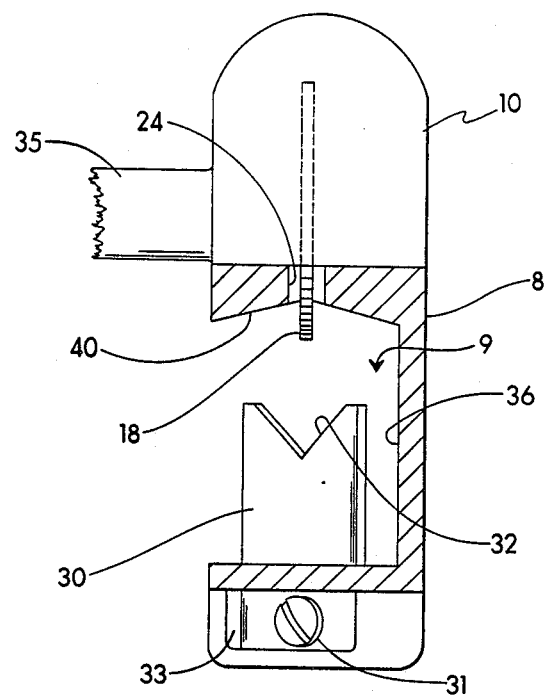
FIG. 3 is a section taken along line 3—3 of FIG. 2.

As depicted at 23, the lower arm 12 is of upwardly opening, channel configuration and is hingedly connected by hinge pin 27 and knuckle projection 29 in the same manner as the upper arm 10. Similarly, the obliquely angled edges 17 serve to limit the outward swing of the arm 12. Adjacent the outer end of the arm 12 is a land portion 25 and an upstanding plate or bracket 30, removably fitted into a canted recess 33 (FIG. 3) provided in the outer end of arm 12. The plate 30 is fastened in place by a screw 31 which fits through a hole adjacent the lower end of the plate 30.

Figure 4:
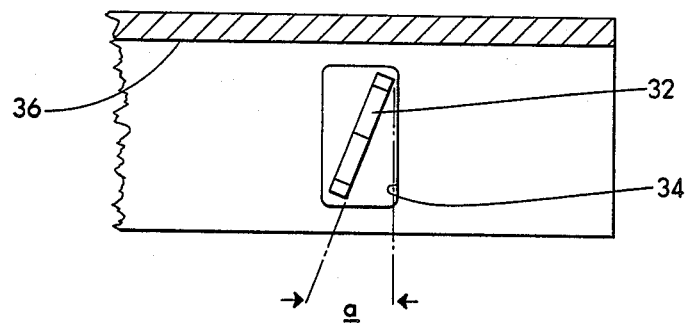
FIG. 4 is a section taken along line 4—4 of FIG. 1.

The bracket 30 is preferably a flat, rectangular metal plate having a concave upper surface of wedge shaped, curved or angular configuration, as illustrated at 32. The plate is disposed or canted at an acute angle a relative to a line perpendicular to the longitudinal axis of channel 9 formed by walls 36, 38 and 39 of the central member 8. This oblique orientation is best illustrated in FIG. 4 and the angle a is selected to correspond with the helix angle of convolutions of conventional armored cable c.

Thus, with the pivotable arms 10 and 12 disposed outwardly, as in FIG. 1, an armored cable c may be inserted longitudinally within the side-opening channel 9 of the central member 8 with one of its grooves between convolutions registered with the V-groove of plate 30. The upper surface of the cable will also be cradled by the downwardly facing wedge-shaped, concave surface 40 provided on the outer end portion 42 of the member 8. This forms a dihedral angle of about 150° to locate and hold the cable with its axis in line with the cutting blade 18.

With one hand holding the cable in this position, the user's other hand is employed to squeeze the two outer arms 10 and 12 into contact with the central channel 8. When this is done, the cable is securely clamped by the upwardly facing wedge of plate 30 and the downwardly facing wedge-shaped wall 40. Then by simply rotating the crank arm 20, the circular saw blade 18 will make a controlled longitudinal cut of sufficient length and depth to separate the armored sheathing. The depth of cut can be finely adjusted by rotating stop-screw 15 to the proper position whereby the blade will not damage the insulation underlying the armored sheathing.

Having described this invention, what is claimed is:

1. Tool for longitudinally severing the shield of corrugated armored electrical cable having convolutions disposed at a predetermined helix angle comprising a central member having a side opening channel defined by upper, lower and side wall portions adapted to receive said cable therein, a first arm member pivotably carried on the upper wall portion of central member and having a rotatable circular saw blade adjacent the free end thereof, a second arm member pivotably carried on the lower wall portion of the central member and adjacent the same end thereof as the first arm, a cable retaining plate extending upwardly from the second arm at a oblique angle which corresponds to the helix angle of the cable convolutions at a distance from the pivoted end thereof which corresponds to the location of the saw blade, said first and second arm members being swingable toward and away from said central member, said central member having a longitudinal slot through its upper wall portion to provide access of the saw blade therethrough and an opening through the lower wall portion of the second arm to provide access of said cable retaining plate therethrough, the upper edge portion of said plate comprising a concave outer edge portion for engaging the lower surface portion of said cable, said central member including a downwardly facing wedge-shaped, concave outer surface portion with the apex thereof in alignment with said slot whereby a cable being cut is adapted to be clamped between the concave surface of the central member and the concave outer edge portion of said cable retaining plate.

2. Tool for longitudinally severing the shield of an armored electrical cable as set forth in claim 1 in which resilient means are provided for releasably urging at least one of said arm members outwardly of said central member and means are provided for limiting the pivotable movement of said first and second arm outwardly of said central member.

3. Tool for longitudinally severing the shield of an armored electrical cable as set forth in claim 2 in which an adjustable stop means is provided for controlling the depth of movement of the saw blade through said slot.

4. Tool for longitudinally severing the shield of an armored electrical cable as set forth in claim 3 in which the concave outer edge portion of said plate is of angular configuration.

* * * * *